B. R. NYHAGEN.
GAS ENGINE VALVE.
APPLICATION FILED APR. 14, 1917. RENEWED FEB. 28, 1919.

1,318,227.

Patented Oct. 7, 1919.
3 SHEETS—SHEET 1.

WITNESSES

INVENTOR
B. R. Nyhagen,
BY Victor J. Evans
ATTORNEY

B. R. NYHAGEN.
GAS ENGINE VALVE.
APPLICATION FILED APR. 14, 1917. RENEWED FEB. 28, 1919.
1,318,227.
Patented Oct. 7, 1919.
3 SHEETS—SHEET 2.
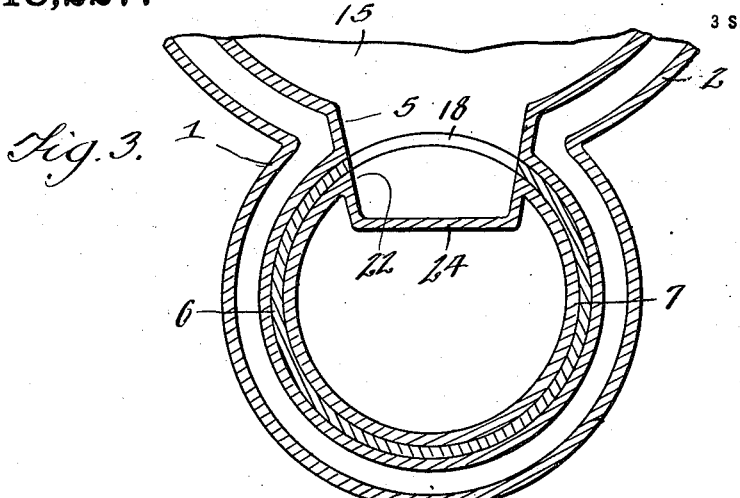
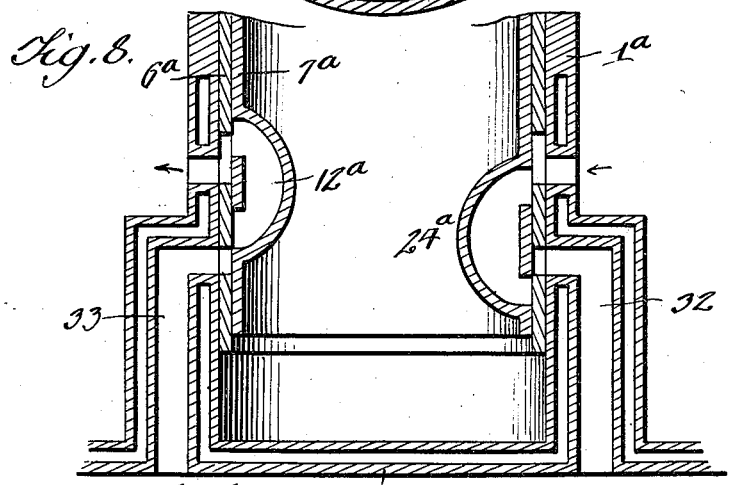
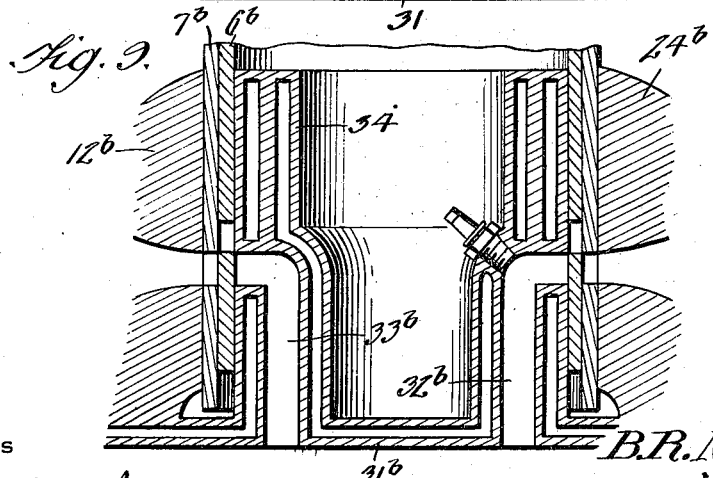
INVENTOR
B.R. Nyhagen,
BY Victor J. Evans
ATTORNEY
WITNESSES

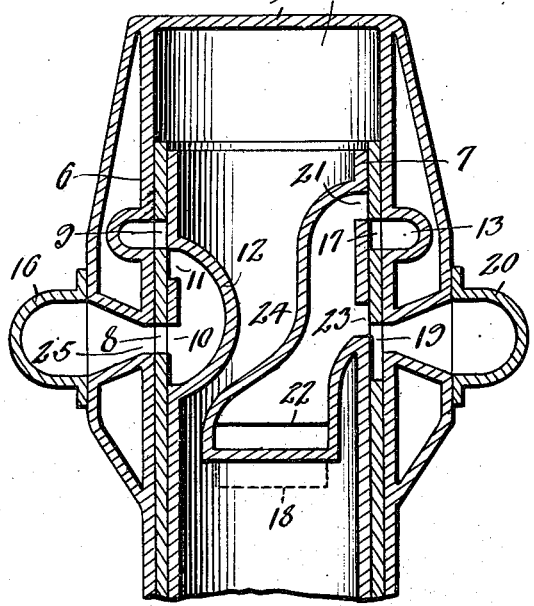
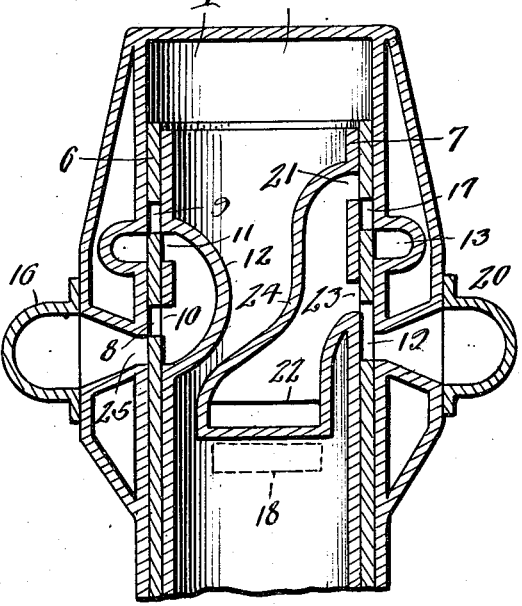
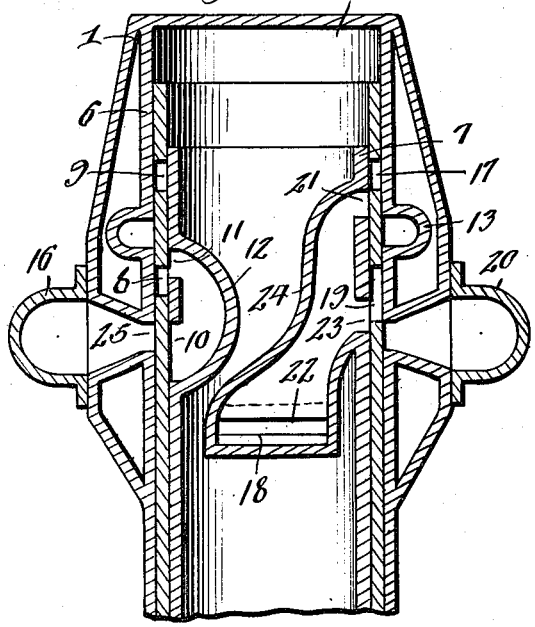
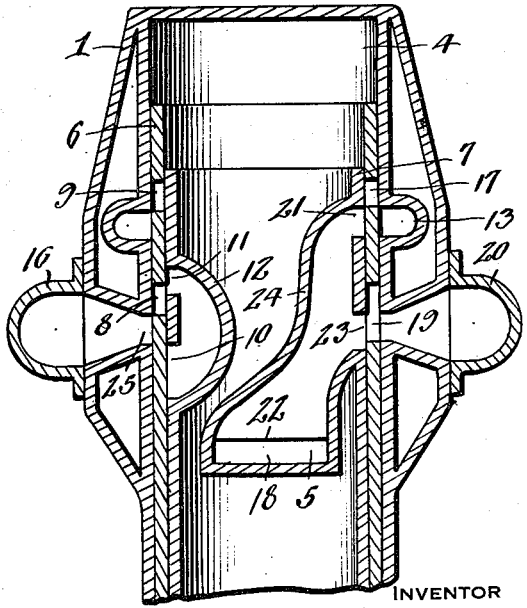

UNITED STATES PATENT OFFICE.

BARNEY R. NYHAGEN, OF NEW YORK, N. Y.

GAS-ENGINE VALVE.

1,318,227.  Specification of Letters Patent.  Patented Oct. 7, 1919.

Application filed April 14, 1917, Serial No. 162,104. Renewed February 28, 1919. Serial No. 279,888.

*To all whom it may concern:*

Be it known that I, BARNEY R. NYHAGEN, a citizen of the United States, residing at New York city, in the county of Bronx and State of New York have invented new and useful Improvements in Gas-Engine Valves, of which the following is a specification.

This invention relates to valves for internal combustion engines, the main object of the invention being to provide a silent valve embodying a novel construction which provides for the free and unobstructed exhaust of the burned gases from the combustion chamber of the cylinder with which it is associated.

A further object of the invention is to produce a valve having a plurality of exhaust ports adapted to simultaneously register with a corresponding number of exhaust ports in communication with the combustion chamber of the associated cylinder.

A further object of the invention is to provide a valve embodying a transfer manifold chamber in communication with a plurality of exhaust ports communicating with the combustion chamber of the associated cylinder, said transfer manifold chamber being arranged to deliver its contents to an exhaust pipe through a single port of large area.

With the above and other objects in view, the invention consists in the novel construction, combination and arrangement of parts, herein described, illustrated and claimed.

In the accompanying drawings:—

Fig. 3 is a horizontal section taken in line with the lower exhaust port.

Fig. 4 is a diametrical section through the valve and its casing with the valve members or sleeves in the position they assume when beginning the suction stroke of the power piston.

Fig. 5 is a similar view showing the position of the valve members when beginning the compression stroke.

Fig. 6 is a similar view showing the position of the valve members when beginning the firing or working stroke.

Fig. 7 is a similar view showing the position of the valve members when beginning the exhaust stroke.

Fig. 8 is a section taken diametrically of the combustion chamber of a cylinder, showing the valve arrangement combined with the cylinder head.

Fig. 9 is a view similar to Fig. 8 but showing a modified arrangement of the valve members.

Figure 1:
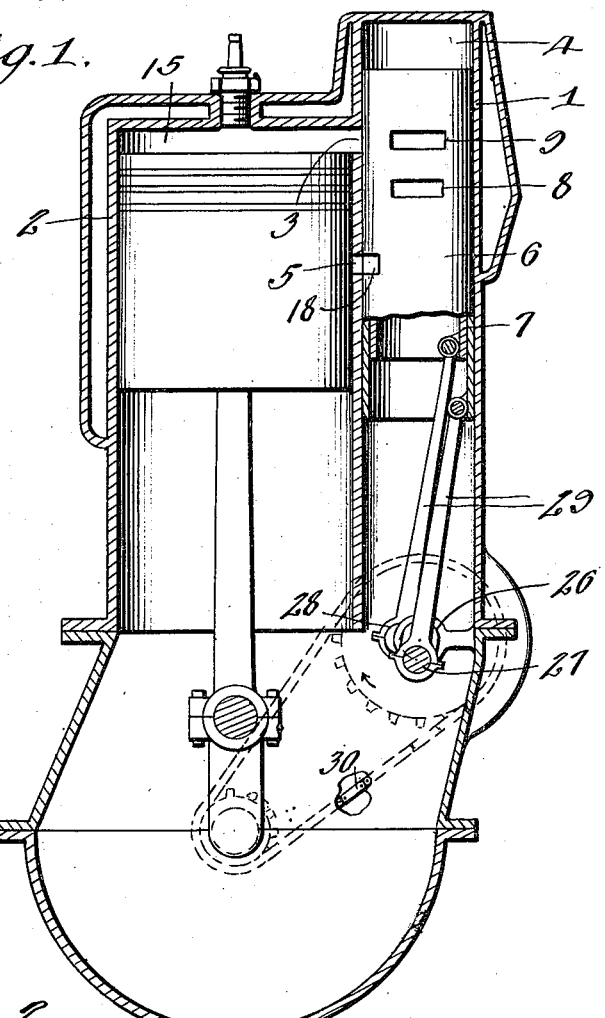
Figure 1 is a vertical longitudinal section through the cylinder of an internal combustion engine and associated valve chamber, said section being taken diametrically of the combustion chamber and the valve chamber.

In the preferred embodiment of this invention, the valve casing 1 is arranged at one side of the combustion chamber of the cylinder 2 with which the valve working in the casing 1 is associated. A combined intake and exhaust port 3 affords communication between the valve chamber 4 of the valve casing 1 and the cylinder, and an additional exhaust port 5 also affords communication between the valve chamber and combustion chamber of the cylinder 2, the port 5 being located at a lower point than the port 3. The cylinder may thus be said to embody two exhaust ports arranged at different points in the movement of the piston, one of said ports constituting also the intake port of the cylinder.

The valve comprises an outer valve member or sleeve 6 and an inner valve member or sleeve 7. In the preferred embodiment of the invention, the valve member 6 works in slidable contact with the inner wall of the valve casing 1 and the valve member 7 works in sliding contact with the inner surface of the valve member 6. Both valve members 6 and 7 are of hollow or tubular cylindrical formation.

The outer valve member or sleeve 6 is formed with an inlet port 8 for the fresh charges of mixture and an outlet port 9 for said mixture. The inner valve member or sleeve 7 is also provided with an inlet port 10 for the explosive mixture and an outlet port 11 for the same. The ports 10 and 11 are joined by a transfer chamber 12 which conducts the explosive mixture from the port 10 to the port 11. The valve casing 1 is formed with an intake port 13, with which the ports 9 and 11 of the valve members are adapted to simultaneously register in one position of said valve members, at which time the mixture contained in the transfer chamber 12 is drawn by suction from the chamber 12 through the intake port 13 into the combustion chamber 15 of the cylinder 2. 16 designates the exhaust pipe which, in the case of a multiple cylinder engine, will be in the form of an exhaust manifold common to all of the cylinders as will be readily understood by those familiar with the art to which this invention appertains.

The outer valve member 6 is provided with three exhaust ports 17, 18 and 19, the intermediate one 19 of said exhaust ports communicating with an exhaust pipe 20 which, in the case of a multiple cylinder engine, will be an exhaust manifold common to all of the cylinders. The inner valve member or sleeve 7 is provided with two inlet exhaust ports 21 and 22 and an intermediate outlet exhaust port 23. The exhaust outlet port 23 is adapted to register with and deliver to the final exhaust port 19. The upper exhaust inlet port 21 is adapted to register with the port 17 of the valve member of sleeve 6, and the lower exhaust outlet port 22 is adapted to register with the port 18 of the valve member 6. 24 designates a transfer manifold chamber which is formed within the body and periphery of the inner valve member or sleeve 7, said chamber 24 being in communication with the exhaust inlet port 21 and the exhaust outlet port 23.

In Fig. 4 the valve members 6 and 7 are in the position they assume at the beginning of the suction stroke, the port 10 registering with the port 8 and the port 11 just beginning to register with the port 9. When all of said ports are properly registered, the explosive mixture is sucked through an inlet port 25 of the valve casing through the ports 8 and 10, the transfer chamber 12, the ports 11, 9 and 13, through the cylinder intake port 3 into the combustion chamber 15, the valve members then move to a position where said ports move out of registry thereby cutting off the further admission of the mixture. During this suction stroke the upper and lower exhaust ports are closed as shown in Fig. 4.

During the compression stroke, the intake and exhaust ports are both closed as shown in Fig. 5, which shows the valve members 6 and 7 at the beginning of the compression stroke. At the beginning of the firing or working stroke, the valve members 6 and 7 have assumed the positions shown in Fig. 6 where it will be seen that the intake and exhaust ports are obstructed by the valve members. At the beginning of the exhaust stroke, the intake ports are closed and the top exhaust port is just beginning to open, the bottom exhaust port having already been partly opened at such time. The position of the valve members just referred to is shown in Fig. 7.

The valve members 6 and 7 are properly timed and operated, preferably by means of a crank shaft 26 having cranks 27 and 28 which control connecting rods 29 attached to said valve members 6 and 7, the shaft 26 being driven by any suitable connection such as a silent chain 30 in turn driven by the crank shaft of the engine. I do not wish to be limited however to any particular means for imparting the reciprocatory movements to the valve members 6 and 7 as said means will vary in accordance with the general design of the engine.

It is also possible to arrange the valve casing and valve members above the head of the cylinder, as shown in Figs. 8 and 9. In the last named figures, the valve casing $1^a$ is formed as an integral part of the cylinder head 31 and formed with an intake port 32 and an exhaust port 33 shown as arranged at diametrically opposite points and extending longitudinally of the walls of the valve casing to the combustion chamber of the cylinder. The valve members $6^a$ and $7^a$ are mounted in the same relation to each other and to the valve casing as shown and described in the preceding figures of the drawings, said valve members being also provided with ports arranged in the same way as previously described and also embodying the intake transfer chamber $12^a$ and the exhaust transfer manifold chamber $24^a$.

Figure 2:
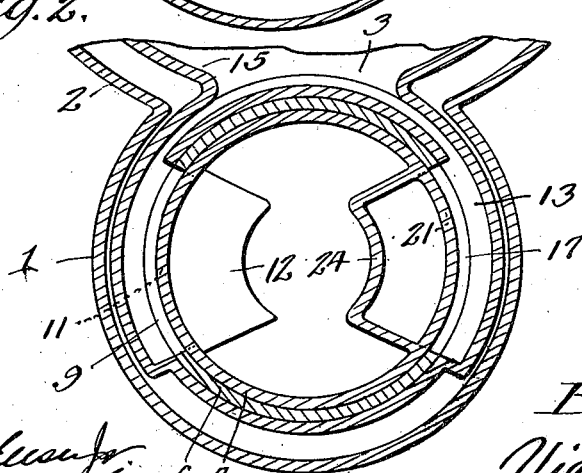
Fig. 2 is a horizontal section taken in line with the intake port and the upper exhaust port.

In Fig. 9, the valve members $6^b$ and $7^b$ are arranged outside of a water jacketed extension 24 of the cylinder head $31^b$ and control diametrically opposite intake and exhaust ports $32^b$ and $33^b$, respectively. The valve member $7^b$ is provided with chambered or hollow extensions $12^b$ and $24^b$ which correspond with the chambers 12 and 24 of Figs. 1 to 7 inclusive and $12^a$ and $24^a$ of Fig. 8. The main difference between the construction illustrated in Figs. 8 and 9 resides in the location of the valve members, said members being arranged inside of the valve casing in Fig. 8 and outside of a cylinder head extension in Fig. 9. In all other respects the operation of the valves shown in Figs. 8 and 9 is the same as in the preceding figures of the drawings.

From the foregoing description taken in connection with the accompanying drawings it will now be seen that I provide for a much freer and quicker exhaust of the burned gases than is provided in the internal combustion engines now in use. This results in higher power efficiency, a cooler engine, and a less accumulation of carbon. The valve members operate silently, sliding upon each other and within the valve casing. The valve casing may be thoroughly water jacketed as indicated at 35 and the valves thus kept in a cool condition. The several ports hereinabove described and illustrated in the drawings may be of any desired horizontal elongation as indicated by the port 22. It will of course be understood that the valve members and the casing therefor may be made of any suitable dimensions according to the size of the cylinder with which the valve members and casing are associated.

I claim:—

1. A valve for internal combustion engines comprising in combination, a power cylinder, a valve casing, inlet and exhaust ports affording communication between said valve casing and cylinder, reciprocatory valve members of hollow cylindrical formation working in said valve casing, and operating means for actuating said valve members out of unison, said valve members having explosive mixture inlet and outlet ports for receiving and conducting the mixture to the cylinder, a transfer chamber within the inner valve member connecting the mixture inlet ports thereof, exhaust ports, and a transfer manifold chamber within the inner valve member and placing two of the exhaust ports of the inner member in communication, the cylinder being provided with two exhaust ports arranged at different points in the path of travel of the piston and adapted to register simultaneously with the exhaust ports of the valve members.

2. A valve for internal combustion engines comprising in combination, a power cylinder, a valve casing, inlet and exhaust ports affording communication between said valve casing and cylinder, reciprocatory valve members of hollow cylindrical formation working in said valve casing, and operating means for actuating said valve members out of unison, said valve members having explosive mixture inlet and outlet ports for receiving and conducting the mixture to the cylinder, a transfer chamber within the inner valve member connecting the mixture inlet ports thereof, exhaust ports, and a transfer manifold chamber within the inner valve member and placing two of the exhaust ports of the inner member in communication, said transfer chamber and transfer manifold chamber extending inwardly toward the center of the inner valve member so as to materially increase the cubic contents of both of said chambers, said transfer manifold chamber being extended for a distance longitudinally of and within the inner valve member and having such extended portion expanded and laterally apertured to form a port elongated circumferentially of said inner valve member.

3. A valve for internal combustion engines comprising in combination, a power cylinder, a valve casing, inlet and exhaust ports affording communication between said valve casing and cylinder, reciprocatory valve members of hollow cylindrical formation working in said valve casing, and operating means for actuating said valve members out of unison, said valve members having explosive mixture inlet and outlet ports for receiving and conducting the mixture to the cylinder, a transfer chamber within the inner valve member connecting the mixture inlet ports thereof, exhaust ports, and a transfer manifold chamber within the inner valve member and placing two of the exhaust ports of the inner member in communication, said transfer manifold chamber being extended for a distance longitudinally of and within the inner valve member and having such extended portion expanded and laterally apertured to form a port elongated circumferentially of said inner valve member.

In testimony whereof I affix my signature.

BARNEY R. NYHAGEN.